Figure 1:
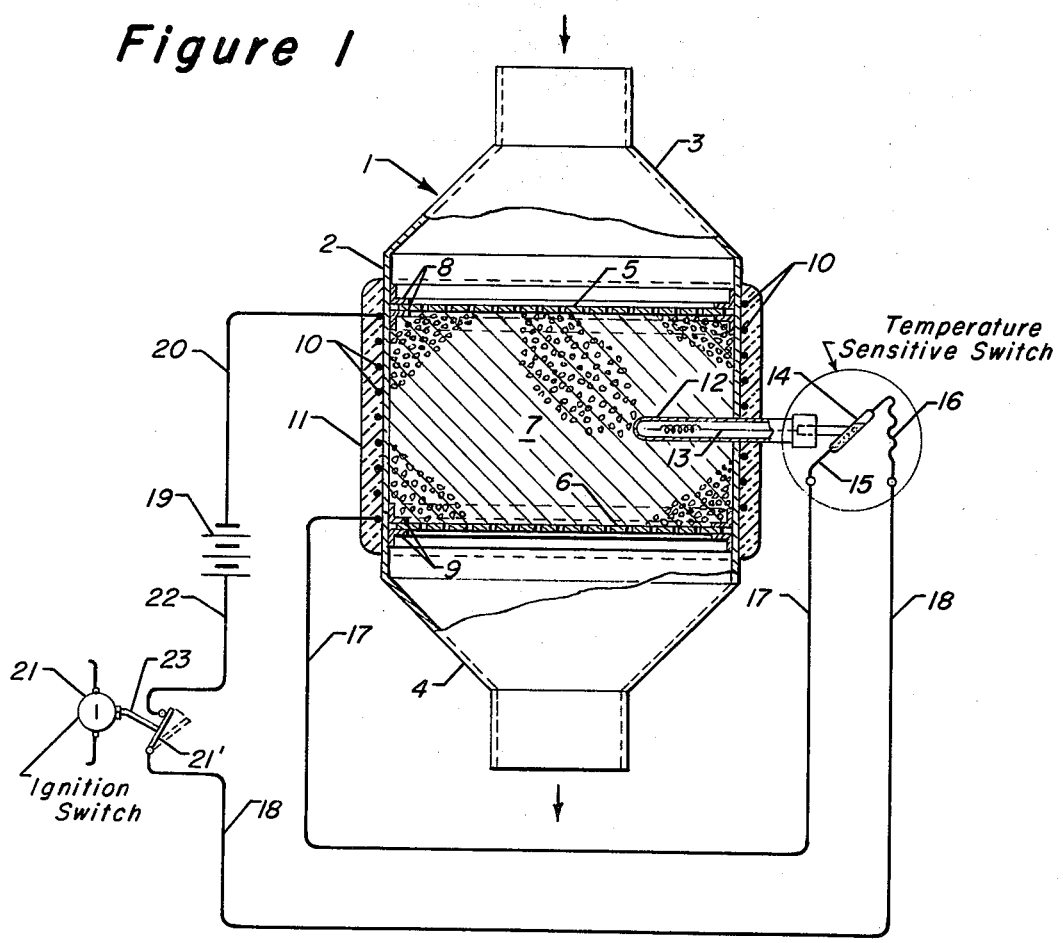

United States Patent [19]
Lee

[11] 3,886,739
[45] June 3, 1975

[54] HEATING OF CATALYTIC CONVERTER CASING

[75] Inventor: Richard K. Lee, Palatine, Ill.

[73] Assignee: Universal Oil Products Company, Des Plaines, Ill.

[22] Filed: Nov. 9, 1973

[21] Appl. No.: 414,583

[52] U.S. Cl............ 60/286; 23/288 F; 23/288 FC; 60/300
[51] Int. Cl............................ F01n 3/00; F01n 3/14
[58] Field of Search............ 23/288 F, 288 J, 288 R; 60/300, 286, 284

[56] References Cited
UNITED STATES PATENTS

| | | | |
|---|---|---|---|
| 2,734,074 | 2/1956 | Redmon | 23/288 J X |
| 2,769,695 | 11/1956 | Frank | 23/288 R |
| 3,150,922 | 9/1964 | Ashley | 23/288 F X |
| 3,450,500 | 6/1969 | Setzer et al. | 23/288 R X |
| 3,761,229 | 9/1973 | Schwartz | 60/300 X |

Primary Examiner—Morris O. Wolk
Assistant Examiner—Michael S. Marcus
Attorney, Agent, or Firm—James R. Hoatson, Jr.; Philip T. Liggett; William H. Page, II

[57] ABSTRACT

The electric heating of a catalytic converter casing around the catalyst zone is provided to preclude the premature contraction of the casing and the crushing of the contained catalyst material while the catalyst is still in a high temperature, expanded condition. The heating operation will normally be controlled so as to be off during the periods that the engine is in operation and will also be cut off when the catalyst bed cools down to a predetermined low temperature where crushing will not be likely to occur.

4 Claims, 3 Drawing Figures

HEATING OF CATALYTIC CONVERTER CASING

The present invention relates to effecting the heating of at least that portion of an exhaust gas converter casing which encompasses the catalyst so as to preclude rapid cooling of the converter after the engine is turned off. In a more specific aspect, an electric heating means for a catalyst converter casing is provided with a control system such that it will only be energized and operated during a catalyst "cool-down" period, i.e., after the engine supplying the exhaust gases has been turned off and prior to the catalyst and casing reaching sufficiently low temperature levels.

In connection with all forms of catalytic converters for treating automobile exhaust gas streams, there has been a problem in preventing catalyst breakage due to the high temperature conditions that are involved and to the frequent cycling between high and low temperature levels. For example, after an automobile has been running for a period of time, the temperature in the catalyst section of the converter may reach the 800° to 1,400° F. level, depending on the location of the catalytic converter relative to the manifold, or even higher. At the same time the converter housing may reach 700° to 1,000° F. Inasmuch as there is a greater coefficient of expansion for the steel forming the housing as compared to the alumina base for the catalyst particles, or a ceramic honeycomb type material for rigid catalyst elements, there may be some built-in compensation for accommodating the differential expansions between the internal catalyst section and the external housing section; however, in practice it has been found catalyst crushing does occur. It also appears that the catalyst breakage problem seems to occur during the cooling-down cycle for the converter rather than during the heating-up period or during normal driving conditions.

In order to preclude the crushing of catalyst and to allow for expansion of a particulate bed, there has been tried the incomplete filling of the catalyst section or, as has been done with rigid skeletal elements there has been the placement of a resilient heat resistant wrapping around the catalyst and along the inside wall of the casing. Experience has shown that in the case of the partially filled catalyst section, the particles can move too easily and, in addition that they can be subjected to pulsations that occur in the exhaust gas stream from an automobile piston type engine and hence undergo fairly rapid breakage. In connection with rigid elements, it has also been necessary to have a resilient packing to take care of the lack of uniform honeycomb sizing, which can vary by ±⅛ inch, as well as accommodate differential expansion. However, there has been a problem in finding suitable resilient material, to place around the element which can withstand the continuous and intermittent high temperature levels of perhaps 1,400° F. or more.

In any event, because the attempts to have expansion space, or to provide a resilient and deformable wrapping material for a rigid catalyst member, have been somewhat unsatisfactory, it is an object of the present invention to incorporate controlled heating for the catalyst housing so as to effect an improved correlation between catalyst bed temperature and the catalyst casing such that the latter will not decrease in temperature and hence contract too rapidly to apply compressive forces to the contained catalyst.

By providing heating of at least a portion of the catalyst housing, it is also an object of the present invention to have compensation for differential temperature conditions between catalyst and housing such that there may be obviated any need of expansion space and/or expansible compressible spacer means around a catalyst section.

Broadly, the present invention provides in combination with a catalytic converter system, which is used for effecting the conversion of a vehicular exhaust gas stream passing therethrough, the improvement which comprises, providing an electrical power source and resistance heating means for at least the wall portion of the converter housing which encompasses the catalyst section therein, and temperature sensitive control means that is connective between said catalyst section and the electric power source to control said heating means and thereby preclude rapid cooling of said housing and a compressive crushing action therefrom on the encompassed catalyst while it is in a high temperature expanded state.

Various types of resistant heating means may be utilized in combination with a catalytic converter housing, as for example, there may be one or more coils of wire serving as resistance heater means which encompass the portion of the converter housing which in turn surrounds the catalyst section of the unit. In another instance, there may be the utilization of a portion of the casing itself which can serve as the resistor and be subject to heating from an electrical power source. Where a portion of the casing itself is serving as the resistor, it is generally of advantage to separate such portion from the rest of the housing by an insulating gasket or other means which will serve to confine the resistant heating to a particular desired portion of the housing.

The power source for the externally heated converter casing may be the battery for the operation of the engine and various accessories of the vehicle or an additional battery may be provided which is utilized solely for the converter heating, with such battery receiving its charge from the conventional engine generator, or additional generator means may be provided. In other words, it is not intended to limit the present invention to any one electric power source, and the power supply means may vary in connection with different types of vehicles and different sized engines or vehicles.

The heating for the converter casing may be initiated when the engine is started and exhaust gas flow is first passed through the converter in order to provide some initial expansion of the converter casing wall which surrounds the catalyst bed; however, typically, it is believed to be more important to have the heating for the converter casing take place after the engine has been turned off so as to preclude a too rapid cooling for the casing around the catalyst section, as heretofore noted. Thus, the circuitry for the heating system may be such as to be completed when the ignition key is turned off and to continue for such period of time as the catalyst bed temperature is above a predetermined level. For example, a thermal couple or a bi-metallic temperature sensitive means connective with the interior of the catalyst bed can serve to operate switching means which will turn off the power supply to the heating coil for the catalyst casing when the catalyst itself is cooled to a relatively low temperature of the order of 400° F. or less. When the catalyst material has reached this lower temperature, the differential temperature will normally be less than 300° F. and there should be no problem of catalyst crushing from a cooled converter casing. It is the intent of the present invention to provide a catalyst converter that may be fully filled and at the same time preclude crushing of the catalyst particles, or a rigid element, so as to also eliminate accompanying problems of alternative converter designs as heretofore noted, such as having a loose catalyst pill which can be subjected to exhaust gas stream pulsing from the automobile engine and the pulsing, in turn, lead to still further breakage problems.

Reference to the accompanying drawing and the following description thereof will serve to illustrate the present converter housing heating system and the automatic control means therefor, as well as set forth advantages which may be obtained from the use of the system.

FIG. 1 of the drawing is a diagrammatic sectional view of a converter unit indicating the utilization of a packed bed of catalyst particles and means for providing heating of the converter casing around the catalyst section.

Figure 2:
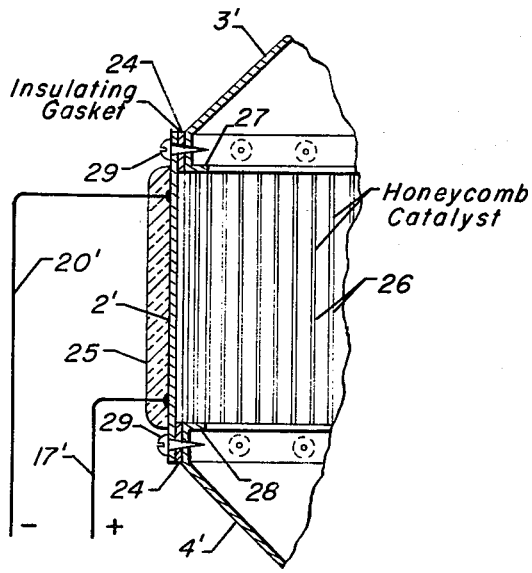

FIG. 2 of the drawing illustrates in a partial sectional view how there may be a variation construction to permit a portion of the converter casing itself to serve as a resistance heating element.

Figure 3:
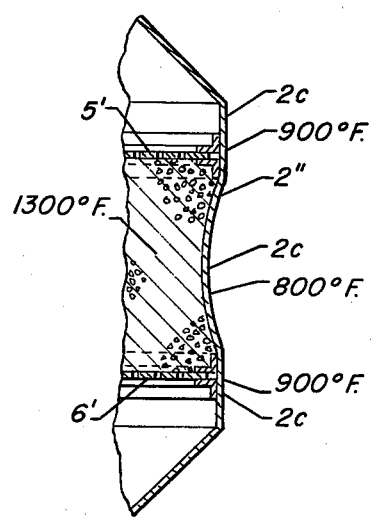

FIG. 3 of the drawing illustrate diagrammatically in a partial section view how there may be variations in temperature and in expansion for different portions of the casing.

Referring now particularly to FIG. 1 of the drawing there is indicated a converter 1 with a side wall portion 2, an inlet end portion 3 and an outlet end portion 4 in order to accommodate the passage of an exhaust gas stream. There is also shown internally the utilization of perforate screens or plate members 5 and 6 to define catalyst section 7 within the central portion of the converter unit 1. Various construction methods may be utilized for retaining the spaced perforate retaining plates 5 and 6; however, in the present embodiment, plate 5 is indicated as being retained between spaced ring support members 8 and the lower plate 6 retained between spaced ring members 9.

In accordance with one embodiment of the present invention, there is a resistance heating coil provided by resistance wire 10 being wrapped continuously around converter wall portion 2 in a manner to be in heat exchange relationship therewith and impart electrical heating to such wall portion. There is also indicated a thin blanket of insulating material 11 as encompassing the heating coil 10 such that the heat is more efficiently transferred to the converter casing itself.

In order to provide a controlled heating system, there is also indicated a thermal-well 12 with bi-metallic means 13 which can rotate or otherwise move to operate a switch means 14. The latter is indicated diagrammatically as movable mercury switch having flexible lead wires 15 and 16 in turn connecting with wires 17 and 18. The bi-metallic means 13 and the switch means 14 are utilized in the present electrical circuitry to insure that power will be supplied to the heating coil 10 during a cooling-down period for the catalytic converter 1. Thus, the adjustment of the bimetallic means 13 and switch means 14 will be such as to provide a closed switch 14 for all temperatures above a predetermined low limit. As heretofore noted, the switch 14 might, for example, be positioned to cut off when bimetallic member 13 reaches a temperature of the order of 400° F., but move to close the circuit for temperature above 400° F.

The circuitry of FIG. 1 also illustrates the use of battery means 19 as the power source connective with lines 20 and 22, with the latter, in turn, connecting with a switch 21' operative from the engine ignition switch means 21. The line 20 connects with one end of resistance coil 10, while the other side of switch 21' connects to line 18 which, in turn, is broken or completed through switch 14 and line 17, and the other end of coil 10, as heretofore noted. In the embodiment shown, the ignition switch 21 has means 23 to operate the closing of switch means 21' when it is in a turned-off position in order to insure that electrical power will be provided to coil 10 after the engine has been in operation and after the converter unit has been in a "heated-up state." Where it is desired to have the heater 10 provide initial heating for converter casing wall 2, then separate switch means may be utilized, separate and apart from ignition switch 21, to insure power supply to the element. However, where it appears that most of the crushing problem for catalyst beds or elements occurs during a cool-down period, then it appears advantageous that most installations may have the control means merely operate during the cool-down period and the wiring circuitry closed at switch means 21' when ignition switch 21 is in the "off" position.

In FIG. 2 of the drawing, there is indicated a wall portion 2' for converter being separated from end section 3' and 4' by electrical and heat resisting insulating means 24. Thus, the wall section 2' may itself serve as an electrical resistance element to in turn provide a heated wall section around the catalyst, without the need of separate resistance coil means. In this instance, there are indicated electrical supply lines 17' and 20' to opposing end portions of the wall section 2' such that it may itself serve as the resistance element. There is also indicated the use of a thin layer of insulation means 25 over wall section 2' so as to preclude fast cooling of such wall section during a cooling-down period or, conversely, the insulation will provide the retention of heat while the entire converter unit is undergoing heating from the exhaust gas stream and the catalyzed reactions taking place in the converter.

In FIG. 2 of the drawing, there is also indicated the use of a rigid or honeycomb type of catalyst element 26 in lieu of subdivided catalyst particles. In this instance, the rigid catalyst element 26 is indicated as being held in place by an inwardly bent flange portion 27 for end section 3' as well as by an inwardly bent flange section 28 for end portion 4'. There is also indicated the utilization of a plurality of spaced threaded screw members 29 for effecting the assembly of the wall section 2' with the respective end sections 3' and 4'.

As heretofore indicated, it is not intended to limit the present invention to any one type of catalyst since the catalyst section will normally comprise a high temperature resistant porous rigid member or a multiplicity of high porosity particles which can be impregnated with a suitable catalytic agent so as to enhance the oxidation of combustible components in the exhaust gas stream. The catalyst may also have more than one active catalytic agent so as to be of advantage in effecting both oxidation and reduction operations and thus assist in the removal, or conversion, of nitrogen oxides to less harmful components, in conjunction with the oxidation of hydrocarbons and carbon monoxide.

In the actual operation of a catalytic converter, it appears that the catalyst element or catalyst bed gradually builds up in temperature from the oxidation reactions taking place over the surface of the catalyst particles and high temperature heating gradually radiated and conducted to the external converter casing. Where transverse catalyst support plates or screens are utilized, it also appears that the peripheral zones encompassing the support areas for the transverse perforate plates or screens will provide the high temperature portions of the converter casing, by virtue of conducted heat to such converter wall portions in addition to the radiated heat from the bed as a whole. Thus, as best shown in FIG. 3 of the drawing, there may be a situation where the wall of the converter at a mid-portion $2_c$ will be slightly lower in temperature than the end portions at $2_e$ where screen members 5' and 6' will provide conducted heat to the converter wall. In other words by way of example, where the catalyst bed may be of the order of 1,300° F. then the wall portions at $2_e$ will be of the order of 900° F. and the central portion $2_c$ at a slightly lower temperature of the order of 800° F. Also, in order to illustrate the differences in temperature and in differential expansions, the central wall portion $2_c$ is indicated as having less expansion than the areas $2_e$. This exaggerated differential expansion also illustrates the problem which can face a conventional uninsulated metal converter housing during its high temperature operation conditions. Also, after the engine is turned off and the catalyst converter unit is cooling down, then the external surfaces will, of course, tend to cool fairly rapidly and cause a resulting gradual lessening of diameter around the internal catalyst section. The catalyst tends to cool more slowly, particularly where the external peripheral portion of the bed tends to also act as an insulation means to retain heat within the central portion of the catalyst section.

With the use of an electrically heated wall section, as provided by the present improved system and such as indicated in FIGS. 1 and 2, there will be retention of heat in the entire wall portion surrounding the catalyst and a more gradual cooling down of the entire unit. However, there will be cooling from the end sections 3 and 4 and from the end portions of the retained catalyst section such that the latter will gradually cool down by radiation and conduction of heat therefrom. Eventually, when the catalyst section reaches a sufficient low level of temperature, the heating coil or other resistance heating means will be de-energized so as to permit cooling of the external wall section around the catalyst without danger of crushing the retained catalyst material.

In order to further illustrate the problem of catalyst crushing, as well as point out the advantage of providing heat for the catalyst converter wall portion which encompasses the catalyst, there has been provided the following Table A which sets forth actual expansions which may be experienced for a 4 inch diameter converter unit of conventional design such as illustrated in the FIG. 1 of the drawing. Specifically, the table sets forth the amount of expansion across a 4 inch diameter for different types of materials, namely: cold-rolled steel; stainless steel (such as type 304); alumina support catalyst (either of a honeycomb configuration or a bed of subdivided pill-like particles); and for a cordierite type of honeycomb support structure for supporting an active catalyst coating. Also, accompanying Table A there are the approximate coefficients of expansion which have been utilized for each of the four types of materials to arrive at the linear expansion for a 4 inch diameter indicated in the columns of the table for the various temperature levels.

TABLE A

| Temp. °F. | Steel[1] | Stainless Steel[2] | Alumina-Honeycomb or Pills[3] | Cordierite "Honeycomb"[4] |
|---|---|---|---|---|
| 1200°F. | .9335" | .0472" | .0216" | .012" |
| 1000°F. | .0280" | .0392" | .0180" | .010" |
| 800°F. | .0224" | .0314" | .0144" | .008" |
| 700°F. | .0196" | .0275" | .0126" | .007" |
| 600°F. | .0168" | .0237" | .0108" | .006" |
| 400°F. | .0112" | .0157" | .0072" | .004" |
| 300°F. | .0084" | .0118" | .0054" | .003" |
| 200°F. | .0042" | .0078" | .0036" | .002" |

(Expansion In Inches For 4" Diameter Converter)

Based On Coefficients of Expansion as follows:
[1]Cold-rolled steel $\cong 7.0 \times 10^{-6}$ in./in./°F.
[2]Stainless (No. 304) $\cong 9.8 \times 10^{-6}$ in./in./°F.
[3]Alumina $\cong 4.5 \times 10^{-6}$ in./in./°F.
[4]Cordierite $\cong 2.5 \times 10^{-6}$ in./in./°F.

From the diameter expansions noted in the above Table A, it can be seen that for a 400° F. temperature differential at high levels, such as for a 1,200° F. catalyst bed of pills (or an alumina honeycomb) compared to an 800° F. steel housing there is an increase of diameter of 0.0216 inches for the pills versus 0.0224 inches for the 4 inch housing which, in theory, should provide no problem. On the other hand, away from the zone of the support plates there might be a 500° F. temperature differential (as shown in FIG. 2) and then that section of the housing would have less expansion than the catalyst to result in some catalyst crushing. Also, with respect to the lower temperature ranges during a cooldown where the bed might be at 700° F. and the wall at 300° F., then the pill bed would be expanded some 0.0126 inches versus only 0.0084 inches for the housing and there would be crushing of the pills in the bed.

With stainless steel, the coefficient is slightly larger; however, with 350° to 400° F. differences in temperature between the bed and the housing wall in the lower temperature levels, there can be the more rapid cooling of the casing wall and the undesired crushing effect.

It will be obvious to those familiar with catalytic converters for exhaust gas streams that there are various types and shapes of converter housings which may be used to encase and to support the catalytic material and it is not intended to limit the present invention to any one type of shape or construction. It is intended, however, that the heating means for the converter casing which encompasses the catalyst section be arranged in a manner to impart heat and effect heat exchange for that portion of the wall which may rapidly cool and tend to contract and effect catalyst crushing around a still expanded high temperature catalyst section. Also, as hereinbefore pointed out, it is not intended to limit the heating means to any one particular type of arrangement although, normally, the heat supply source will be from a battery and suitable temperature sensing means and switching means will be utilized in combination with the catalyst section to control the electric power to the heating unit so as to effect a cut-off or a turning on of power as is necessary. Still further, it is not intended to limit the switch means to bi-metallic movement means and mercury switch types of operations inasmuch as other types of temperature sensing means, such as thermocouples, liquid expansion means, and the like, may well be utilized to provide a suitable output which may be used as is, or amplified, to effect the desired mechanical switching of power input, or power cut-off, to the heating element of the unit.

I claim as my invention:

1. In a combination of a catalytic converter and a control system therefor, said combination being utilized for effecting the conversion of an internal combustion engine exhaust gas stream passing through said catalytic converter, the improvement comprising, a converter housing having a wall portion surrounding a catalyst section therein, an electrical power source, a resistance heating means encompassing at least a part of said wall portion of said converter housing, said resistance heating means being in interconnection with said electrical power source, a temperature response means immersed in said catalyst section being responsive to the temperature therein, an ignition key means in interconnection with said engine for providing electrical power to said engine, a switch means in interconnection with said key means, said temperature responsive means and said electrical power source, said temperature responsive means actuating said switch means to thereby cut off said electrical power source to said resistance heating means at a predetermined temperature when the ignition key means provides power to said engine, and conversely closing said switch means to provide electrical power to said resistance heating means at a predetermined temperature when said ignition key means is deactuated and said engine is thereby deactuated, thereby to preclude rapid cooling of said converter housing and consequent compressive crushing action therefrom on the encompassed catalyst within said catalyst section after engine cut-off and while said catalyst is in a high temperature expanded state resultant upon ordinary engine operation.

2. The catalytic converter system of claim 1 further characterized in that said resistance heating means comprises at least one resistance heating coil wrapped around at least a wall portion of the converter housing to effect the desired heating thereof around said catalyst section.

3. The catalytic converter system of claim 1 further characterized in that at least said wall portion of the converter housing which encompasses the catalyst section is electrically insulated from the remaining portions of said housing and is further provided with electric power to provide resistance heating such that such isolated portion of said housing serves as the resistance heating means to provide for a heated and expanded condition until the catalyst in the housing reaches a predetermined low temperature level.

4. The catalytic converter system of claim 1 further characterized in that heat insulating means is provided around said resistance heating means to retain heat for said wall portion encompassing said catalyst section.

* * * * *